United States Patent
Seshadri

(10) Patent No.: US 6,249,808 B1
(45) Date of Patent: Jun. 19, 2001

(54) WIRELESS DELIVERY OF MESSAGE USING COMBINATION OF TEXT AND VOICE

(75) Inventor: Nambirajan Seshadri, Chatham, NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/212,324

(22) Filed: Dec. 15, 1998

(51) Int. Cl.[7] .................................................. G06F 13/38
(52) U.S. Cl. ............................................ 709/206; 709/203
(58) Field of Search ................................... 709/200–253; 455/412–414, 563, 567; 375/216

(56) References Cited

U.S. PATENT DOCUMENTS

| | | | | |
|---|---|---|---|---|
| 5,771,353 | * | 6/1998 | Eggleston et al. | 709/227 |
| 5,781,857 | * | 7/1998 | Hwang et al. | 455/412 |
| 5,951,638 | * | 9/1999 | Hoss et al. | 709/206 |
| 6,061,718 | * | 5/2000 | Nelson | 709/206 |
| 6,161,007 | * | 12/2000 | McCutcheon et al. | 455/412 |
| 6,175,858 | * | 1/2001 | Bulfer et al. | 709/206 |
| 6,185,535 | * | 2/2001 | Hedin et al. | 704/270 |
| 6,185,603 | * | 2/2001 | Henderson et al. | 709/206 |

\* cited by examiner

*Primary Examiner*—David A. Wiley

(57) ABSTRACT

An email is received and stored at a network node. The email message is divided into a first text portion and a second voice portion. The division of the email message into the first and second portions can be determined by user preferences stored in a user profile in the network or by attached keywords or audio email. The first text portion is transmitted to a wireless communication device for display on a display of the device. The text portion of the message may be transmitted using a data channel or on a voice channel. The voice portion of the message is converted into speech and is transmitted to the device using a voice channel. In accordance with another embodiment, the communication device receives the email message from the network as a text message and the device performs the splitting and conversion from text to speech locally.

25 Claims, 5 Drawing Sheets

WIRELESS DELIVERY OF MESSAGE USING COMBINATION OF TEXT AND VOICE

FIELD OF THE INVENTION

The present invention relates generally to the delivery of messages to a wireless communication device. More particularly, the present invention relates to the delivery of messages to a wireless communication device using a combination of text and voice.

BACKGROUND OF THE INVENTION

Electronic messaging (e.g. email) is becoming an increasingly popular way for people to communicate with each other. Typically, a message sender uses a computer connected to a network and sends a message to the recipient using a computer connected to the same or another network. The email message traverses the network(s) and is received at the recipients computer. One problem with this type of delivery method is that the message recipient may receive an email message while he/she is away from a computer and is thus unable to retrieve the email message.

One solution to this problem is to allow users to retrieve email messages using a convention telephone. In this solution, a message recipient uses a conventional telephone to call a message retrieval platform which is connected to the user's email server where the user's email messages are stored. The message retrieval platform converts the email messages into voice and delivers the voice to the user via the telephone connection. See co-pending, commonly assigned U.S. patent applications Ser. No. 08/816,608 to Henderson et al., filed on Mar. 13, 1997, and Ser. No. 09/167,114 to Kocheisen et al., filed on Oct. 6, 1998. The user retrieving messages in this manner may also control the message retrieval (e.g. repeat message, skip message, delete message, etc.) using the telephone keypad. With the widespread use of wireless telephones, the retrieval of email messages in this manner has become more convenient. However, one problem with this solution is that email messages are created with the expectation that the text of the email message will be read by the recipient. As such, when these messages are converted to speech via a text to speech converter, it is somewhat awkward for the recipient. For example, listening to the email header information may be awkward. In fact, the user may not even want to listen to the particular message. Wireless airtime is expensive and retrieving long messages in this manner can become costly.

Another way to send email messages to a wireless device is to send the actual text message to the device. Many advanced digital wireless telephones now have a textual display area and are capable of receiving short text messages of about 80 characters. One such service is called the Short Message Service, a standard which is a part of virtually every digital cellular service. One shortcoming of the delivery of email in this way is the restriction of the length of the message. Many email messages are longer than 80 characters and as such they cannot be delivered as text to these wireless telephones.

Thus, what is needed is an improved technique for delivering email messages to wireless communication devices, such as wireless telephones.

SUMMARY OF THE INVENTION

The present invention provides an improved technique for delivering email messages to users of wireless devices. In accordance with the invention, a portion of an email message is converted to a voice message, while another portion of the email message remains as a text message. The combination of the voice message and text message is delivered to the user via a wireless communication device.

In accordance with one embodiment of the invention, a network message server receives a text message addressed to a wireless communication device. The message server transmits a first portion of the message to the wireless communication device as a text message. A second portion of the message is converted from text to speech and this second portion of the message is transmitted to the wireless communication device as a voice message. In accordance with one aspect of the invention, a subscriber profile stored in the wireless communication network stores information indicating how text messages received for the subscriber are to be divided into text and voice portions.

The text portion of the message may be sent to the wireless communication device using a data channel, such as a wireless control channel or wireless messaging channel (also referred to in the description below as out-of-band). Alternatively, the text portion of the message may be sent to the wireless communication device using a voice channel (referred to as in-band). If the text is sent using a voice channel, the wireless communication system may reduce the speech coding rate of voice information transmitted to the wireless communication device during the transmission of the text message so as to free up bandwidth for the transmission of the text message using the voice channel. Alternatively, the wireless communication system may send the text message via the voice channel during a time when it detects that no voice information is being sent on the voice channel.

In accordance with another embodiment of the invention, the inventive technique may be performed locally by the wireless communication device. The wireless communication device receives an email message from the wireless communication network in text format and stores the text in its memory. The wireless communication device splits the message into a first text portion and a second voice portion. The splitting can be determined by user preferences stored locally in the memory of the wireless communication device. The splitting can also be determined based on audio keywords or audio email attached by the sender. The first text portion of the message is displayed to the user on the display of the wireless communication device. The wireless communication device locally converts the second voice portion of the message into speech and plays the speech to the user via a speaker.

These and other advantages of the invention will be apparent to those of ordinary skill in the art by reference to the following detailed description and the accompanying drawings.

DETAILED DESCRIPTION

Figure 1:
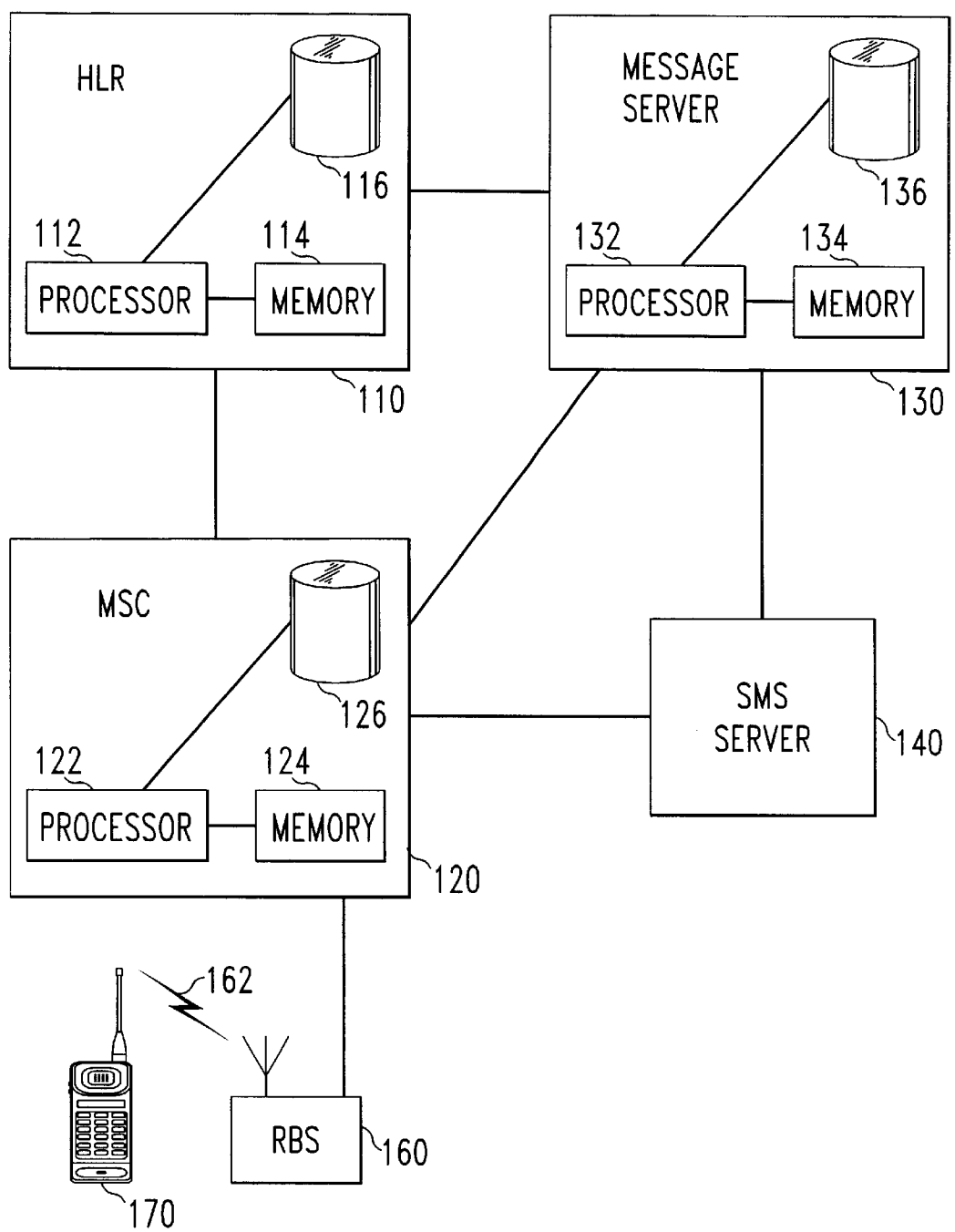
FIG. 1 shows a wireless communication network in which the present invention may be implemented.

FIG. 1 shows a wireless communication network 100 in which the present invention may be implemented. A wireless communication device 170 is communicating with a radio base station (RBS) 160 via a wireless communication link 162. The wireless communication device 170 may be for example a wireless telephone which can provide both voice communication functions and text communication functions. The RBS 160 is connected to a mobile switching center (MSC) 120. The MSC 120 is typically connected to more than one RBS, where each RBS provides wireless communication to wireless communication devices operating within the geographic area (i.e., cell) served by the RBS. The MSC 120 controls the functions of the RBSs connected to it. Only one RBS 160 is shown in FIG. 1 for clarity.

MSC 120 is an intelligent switching device which operates under control of a computer processor 122 executing computer program instructions. The MSC 120 also includes memory 124 and database 126 for the storage of computer program instructions and other data. Although not shown in FIG. 1, one skilled in the art would recognize that MSC 120 would also contain other components in order to provide the switching functions typical in a wireless communication network.

The MSC 120 is connected to a home location register (HLR) 110. The HLR 110 is an intelligent network node which functions under control of computer processor 112 executing computer program instructions. The HLR 110 also includes memory 114 and database 116 for the storage of computer program instructions and other data. Database 116 is used to store user profile records for subscribers of wireless communication services. The database 116 and user profile records will be discussed in further detail below.

The HLR 110 and the MSC 120 are connected to a message server 130 which performs certain functions in accordance with the invention. Message server 130 is an intelligent network node which operates under control of a computer processor 132 executing computer program instructions. The service node 130 also includes memory 134 and database 136 for the storage of computer program instructions and other data.

The HLR 110, MSC 120 and message server 130 are also connected to a short message service (SMS) server 140. SMS server 140 controls the delivery of SMS messages to wireless communication device 170.

One skilled in the art will recognize that for purposes of clarity, FIG. 1 is a high level functional block diagram of wireless communication network 100. The detailed architecture of such a network is well known in the art and such details are not important for an understanding of the present invention. Such details have been omitted from FIG. 1 for clarity. Further, various alternate embodiments are possible.

Figure 2:
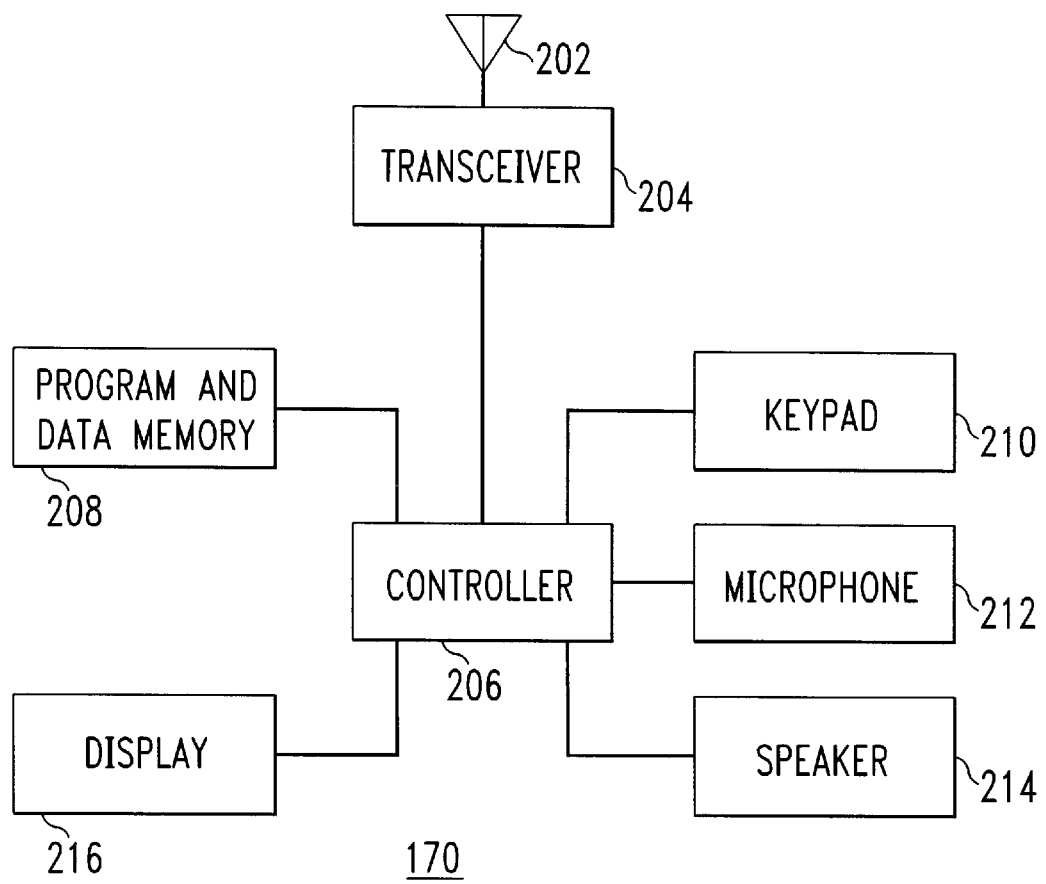
FIG. 2 shows a block diagram of the components of a wireless communication device configured in accordance with the present invention.

FIG. 2 shows a block diagram of the components of wireless communication device 170 configured in accordance with the present invention. Wireless communication device 170 includes a transceiver 204 which sends and receives signals from antenna 202. The overall functioning of the wireless communication device 170 is controlled by a controller 206 which operates by executing computer program instructions which are stored in program and data memory 208. It is these program instructions which defined the overall operation of the wireless communication device 170. Program and data memory 208 also stores other data which is necessary for the operation of the wireless communication device 170, such as user preferences, user telephone number, communication provider identification, and wireless communication device identification. In addition, program and data memory 208 has at least a portion of which is non-volatile, such that the information contained therein remains after power to the wireless communication device 170 is turned off. Although FIG. 2 shows program and data memory 208 as one component, it would be recognized by one skilled in the art that program and data memory 208 could be implemented with separate memory units.

Wireless communication device 170 also includes a keypad 210 to allow a user to communicate with controller 206. Sound information is received from a user via microphone 212 and sound information is played to the user via speaker 214. The wireless communication device 170 also includes a display 216 to allow the controller 206 to display alphanumeric data to the user. It is to be understood that the block diagram is for illustrative purposes only. The design and operation of wireless stations are well known in the art and various modifications are possible.

Figure 3:
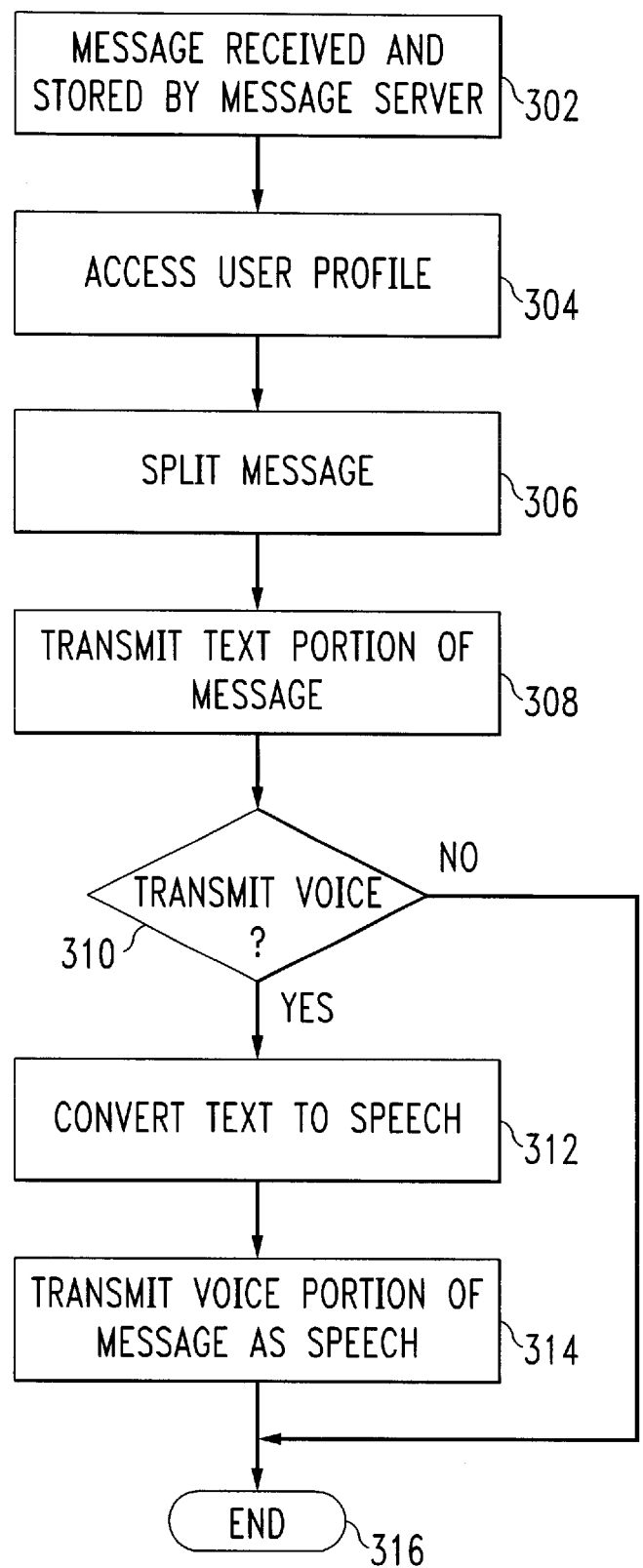
FIG. 3 is a flowchart showing the steps performed in a communication network in accordance with one embodiment of the invention.
Figure 5:
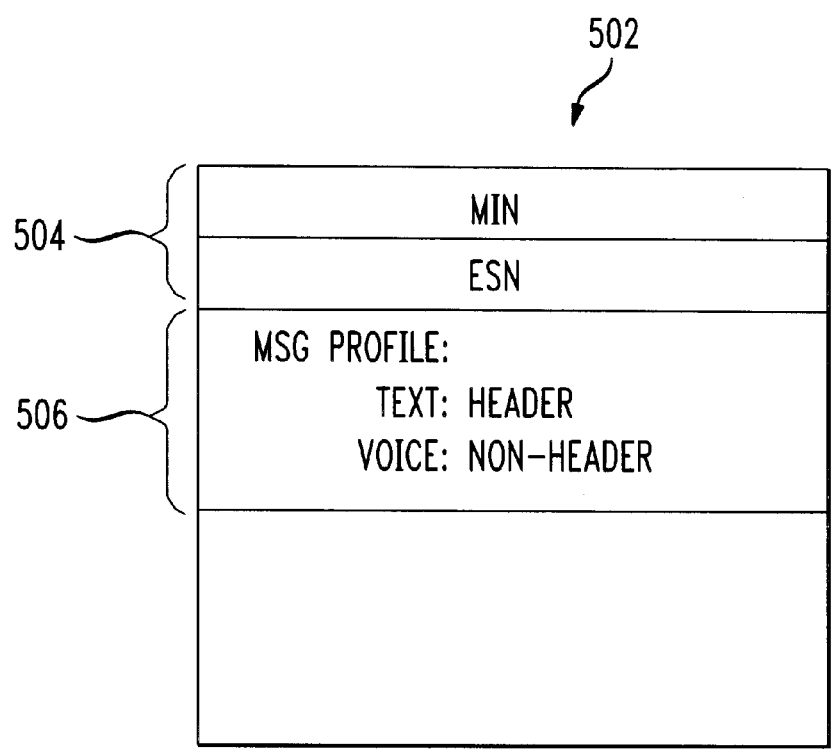
FIG. 5 shows an example subscriber profile record.

A description of the steps to be performed in accordance with one embodiment of the invention will be described with reference to the flowchart shown in FIG. 3. In step 302 an email message addressed to wireless communication device 170 is received and stored at message server 130. Upon receipt of the message, message server 130 performs a database lookup to access a subscriber profile record associated with the user of wireless communication device 170. The subscriber profile record is stored in database 116 of HLR 110. An example subscriber profile record 502 is shown in FIG. 5. The key fields 504 of the subscriber profile record 502 contain a unique identification of the wireless communication device 170 using the mobile identification number (MIN), and electronic serial number (ESN) of the wireless communication device 170. The MIN is the telephone number of the wireless communication device 170 assigned by the service provider. The ESN is a unique serial number assigned to the wireless communication device 170 during manufacture. The ESN/MIN pair uniquely identifies the wireless communication device 170. In accordance with one aspect of the invention, the subscriber profile record 502 includes a field 506 which is used to store the subscriber's messaging preferences. In accordance with the invention, an email message is divided into a text portion and a voice portion, and the division of the message into these portions may differ depending on the preferences of the subscriber. For example, as shown in field 506 of the subscriber profile record 502, email messages sent to wireless communication device 170 are to be divided with the header information as a text message and the remainder of the message as a voice message. Messages may be split in other ways as well. For example, a subscriber profile record could indicate that only some portion of the header, such as the sender and priority of the message, be transmitted as a text message, with the remainder of the header and body of the message sent as a voice message. Of course, there are any number of ways to split up the message, and the field 506 of the subscriber profile record 502 stores the subscriber's preference for dividing the message.

In step 306 the received message is split in accordance with the subscriber preferences determined in step 304. The message is split by retrieving the message from storage 136 of the message server 130 and storing the message in storage 136 as two portions, a text portion and a voice portion. At this point, it is noted that the voice portion is actually still stored in storage 136 as a text message, although it is designated as the voice portion of the message.

In step 308 the text portion of the message is transmitted to the wireless communication device to be displayed on display 216 of wireless communication device 170. In step 310 the message server 130 waits for the user of wireless communication device 170 to request the voice portion of the message. Upon receipt of such a request, the message server 140 retrieves the voice portion of the message from storage 136 and converts it to speech. This text to speech conversion may be accomplished with any appropriate known technique for converting text to speech. Such text to speech conversion is well known in the art and will not be described in detail herein. In step 314 the message server 130 transmits the voice portion of the message to the wireless communication device 170. The method ends in step 316.

If, based on the text of the message, the subscriber does not request the voice portion of the message, then the test in step 310 will be NO and the method ends in step 316.

In addition to sending the text portion of the email message to the wireless device, the message serve 130 may also generate and transmit additional information which was not part of the original email message. For example, it may be useful for the subscriber to know the length of the voice portion of the message (e.g. in minutes) prior to making a decision whether or not to retrieve the voice portion. The message serve 130 may be configured to determine the length of the voice portion of the message and to send length information to the wireless communication device 170 along with the text portion of the email message. Other additional information, such as whether there are attachments to the email message, may also be generated by the message server 130.

Given the above description of the steps performed by message server 130 in accordance with the invention, it is noted that there are various embodiments which are possible in order to implement the invention. For example, in one embodiment, the text message is sent as an out-of-band message to the wireless communication device 170. That is, the text message is sent in a data channel which is separate from any voice channel used by the wireless communication device 170. In this embodiment, in step 308, the message server 130 retrieves the text portion of the message from storage 136 and transmits the text portion of the message to sms server 140 with an indication that wireless communication device 170 is the intended recipient of the text message. The wireless communication device 170 will be identified by its MIN/ESN pair. Upon receipt of the text message, the sms server 140 will transmit the text message to the MSC 120. The MSC 120 will transmit the text message to the wireless communication device via RBS 160 and air interface 162. In this embodiment, the text message is sent to the wireless communication device 170 from the RBS 160 using a data channel, rather than a voice channel. The user of a data channel to send text messages to wireless communication devices is well known in the art. Upon receipt of the text message, the subscriber using wireless communication device 170 may read the message on the display 216 in order to determine if he/she wants to retrieve the remainder of the message in the form of a voice message. If the subscriber wants to retrieve the remainder of the message, the subscriber sends and appropriate message to the message server, for example by pressing an appropriate sequence of keys on the keypad 210, indicating that the remainder of the message should be sent. The message sent by the subscriber is sent to the message server using the data channel. Upon receipt of such a message, the message server 136 converts the voice portion of the message from text to speech and transmits the voice to the wireless communication device 170. It is noted that at this point, the MSC 120 must establish a voice channel with the wireless communication device 170 using a voice channel between RBS 160 and wireless communication device 170. This channel can either be traditional circuit switched or it can be a packet switched with the packet header containing information as to how to decode the packet (text packet to display and speech packet to speaker).

It is noted that the data channel used to send the text messages may be a dedicated data channel set up for purposes of sending the text message. Alternatively, the data channel may be implemented using an existing control channel of the communication network. Such control channels are well known in wireless communication networks and are used to communicate control information to and from wireless communication devices.

In an alternate embodiment of the invention, the text message is sent as an in-band message to the wireless communication device 170. That is, the text message is sent in a voice channel which is otherwise used to transmit voice information. Assume that the wireless communication device is engaged in a conventional telephone call and thus there is a voice channel established between the wireless communication device 170 and RBS 160. Such a voice channel is well known in the art, and may be, for example, a time division multiple access (TDMA) voice channel such that various wireless communication devices may share the same radio frequency by dividing up the frequency in the time domain and assigning each wireless communication device certain time frames for use in transmitting and receiving information. In accordance with the present invention, the text portion of the email message stored at message server 130 may be sent to the wireless communication device 170 using this voice communication channel. In accordance with this embodiment, the text message is sent directly from the message server 130 to the MSC 120 and the MSC 120 is configured to recognize the receipt of a text message and send it to the appropriate wireless communication device via the voice channel. However, in order for the text message not to interfere with any voice conversation that may be taking place, certain techniques must be used.

One such technique is to transmit the text portion of the message during periods in which no voice information is being transmitted. Thus, in accordance with this technique, the MSC 120 will monitor the voice channel and when the MSC 120 detects that no voice information is being sent during a time frame which is otherwise assigned to the wireless communication device 170, the MSC 120 will transmit the text message to the wireless communication device.

Another technique is to reduce the voice coding rate of the MSC 120 in order to free up bandwidth for the transmission of the text information. In accordance with this technique, the voice coding rate that the MSC 120 uses to encode voice information sent to the wireless communication device during a telephone call is reduced during the period in which text information is also to be transmitted via the voice channel. In this way, part of the voice channel can become available for the transmission of the text message with little adverse affect on the voice quality of the telephone conversation. After transmission of the text message has been completed, the voice coding rate may return to normal.

Another technique is to periodically transmit small amounts of the text message via the voice channel during a telephone call without reducing the voice coding rate of the MSC 120. Although this will result in degradation of the quality of the voice signal, the degradation may be small enough as to be acceptable.

It is noted that in the above described embodiment, in which the text portion of the message is sent to the wireless communication device 170 in-band in the voice channel, the wireless communication device 170 must be properly configured to distinguish between the receipt of the text message and receipt of voice information. The wireless communication device 170 may be so configured through appropriate computer program instructions stored in memory 208.

Figure 4:
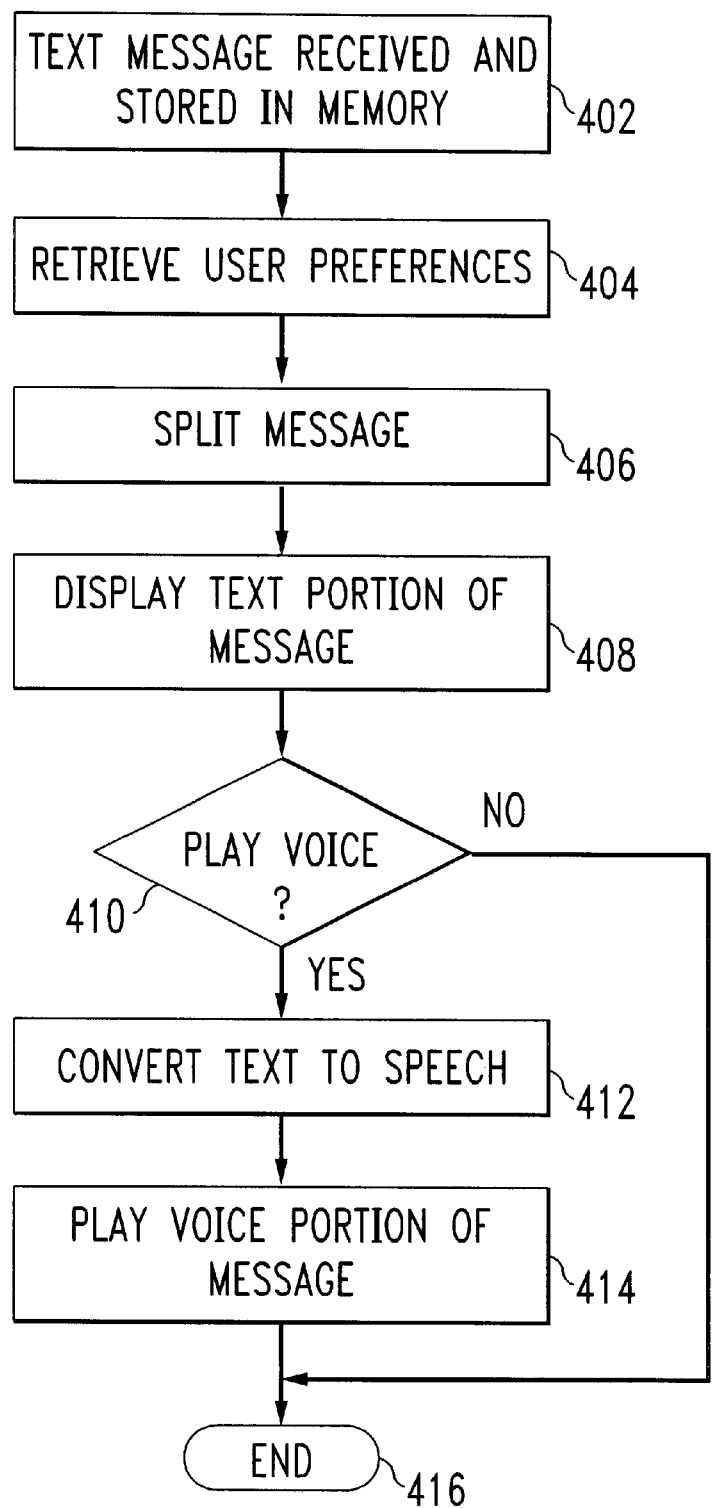
FIG. 4 is a flowchart showing the steps performed by a wireless communication device in accordance with another embodiment of the invention.

In accordance with another embodiment of the invention, the steps of the invention may be performed locally by the wireless communication device 170 instead of in the wireless communication network 100. The flowchart of FIG. 4 shows the steps performed by the wireless communication device 170 in accordance with this embodiment. In step 402 an email text message is received at the wireless communication device 170 from the wireless communication network 100 and the message is stored in memory 208. The email message received in step 402 may be received in a manner as described above with respect to receipt of the next portion of the message. Since the entire email message is being received, it is advantageous to use an out-of-band data channel in this embodiment. However, the entire email message may also be received using the in-band techniques described above. In step 404 the wireless communication device 170 retrieves user preferences from memory 208. As described above in connection with the user profile, the user preferences stored in memory 208 indicate how the email message is to be divided into a text portion and a voice portion.

In step 406 the received message is split in accordance with the subscriber preferences determined in step 404. The message is split by retrieving the message from memory 208 and storing it in memory 208 as two portions, a text portion and a voice portion. At this point, it is noted that the voice portion is actually still stored in memory 207 as a text message, although it is designated as the voice portion of the message.

In step 408 the text portion of the message is displayed on the display 216 of the wireless communication device 170. In step 410 the wireless communication device 170 waits for the user of wireless communication device 170 to request the voice portion of the message. Upon receipt of such a request, the wireless communication device 170 retrieves the voice portion of the message from memory 208 and converts it to speech. In step 414 the wireless communication device 170 provides the voice portion of the message to speaker 214. The method ends in step 416.

If, based on the text of the message, the user does not request the voice portion of the message, then the test in step 410 will be NO and the method ends in step 416.

The steps shown in FIG. 4 are performed by the wireless communication device 170 by the controller 206 executing appropriate computer program instructions stored in memory 208. Alternatively, the wireless communication device could have additional components for performing certain of the steps. For example, the text to speech conversion of step 412 could be performed by the wireless communication device 170 by the controller 206 executing appropriate computer program instructions stored in memory 208. Alternatively, the wireless communication device 170 could have a separate hardware converter for performing this function.

In another aspect of the invention, the sender can initially divide the message into a text portion and a voice portion. For example, the sender can attach the voice portion as an "audio email" to the text-based email, or the sender can attach "audio keywords", e.g. by including some form of markup tag in the text that can be recognized by the server or the device. Accordingly, the user/recipient can first hear the audiotext and can decide whether to supplement the audio with the text-based e-mail. This permits the sender of the email to initially control the splitting of the text email message into text and speech (audio) rather than the user/recipient.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for providing a message to a wireless communication device comprising the steps of:

receiving a text message at a network message server;

transmitting a first portion of said text message to said wireless communication device;

converting a second portion of said text message into a voice message; and transmitting said voice message to said wireless communication device.

2. The method of claim 1 further comprising the steps of:

establishing a voice channel with said wireless communication device;

establishing a data channel with said wireless communication device; and transmitting said first portion of said text message to said wireless communication device via said data channel.

3. The method of claim 2 wherein said text message is transmitted as a short message service message.

4. The method of claim 1 further comprising the steps of:

establishing a voice channel with said wireless communication device; and transmitting said first portion of said text message to said wireless communication device via said voice channel.

5. The method of claim 4 comprising the step of:

reducing a speech coding rate of voice information transmitted to said wireless communication device via said voice channel during the transmission of said first portion of said text message.

6. The method of claim 4 further comprising the step of:

transmitting said first portion of said text message during a time period in which voice information is not being transmitted via said voice channel.

7. The method of claim 4 further comprising the step of:

transmitting said first portion of said text message during periodic time intervals.

8. The method of claim 1 further comprising the step of:

accessing a subscriber profile stored in a database to determine the division of said text message into said first and second portions.

9. The method of claim 1 further comprising the step of:

analyzing said text message's contents to determine the division of said text message into said first and second portions.

10. The method of claim 1 further comprising the step of:
generating additional information which is not part of said received text message; and
transmitting said additional information to said wireless communication device along with said first portion of said text message.

11. A wireless communication network comprising:
a message server for storing a text message;
means for transmitting a first portion of said text message to a wireless communication device;
a converter for converting a second portion of said text message into a voice message; and
means for transmitting said second voice message to said wireless communication device.

12. The wireless communication network of claim 11 further comprising:
means for establishing a voice channel with said wireless communication device;
means for establishing a data channel with said wireless communication device; and
means for transmitting said first portion of said text message to said wireless communication device via said data channel.

13. The wireless communication network of claim 12 wherein said text message is transmitted as a short message service message.

14. The wireless communication network of claim 11 further comprising of:
means for establishing a voice channel with said wireless communication device; and
means for transmitting said first portion of said text message to said wireless communication device via said voice channel.

15. The wireless communication network of claim 14 further comprising:
a speech coder configured to reduce a speech coding rate of voice information transmitted to said wireless communication device via said voice channel during the transmission of said first portion of said text message.

16. The wireless communication network of claim 14 further comprising:
means for transmitting said first portion of said text message during a time period in which voice information is not being transmitted via said voice channel.

17. The wireless communication network of claim 14 further comprising:
means for transmitting said first portion of said text message during periodic time intervals.

18. The wireless communication network of claim 11 further comprising:
a storage device for storing a subscriber profile indicating the division of said text message into said first and second portions.

19. The wireless communication network of claim 11 further comprising:
means for analyzing said text message's contents in order to determine the division of said text message into said first and second portions.

20. The wireless communication network of claim 11 further comprising:
means for generating additional information which is not part of said received text message; and
means for transmitting said additional information to said wireless communication device along with said first portion of said text message.

21. A method of operation of a wireless communication device comprising the steps of:
receiving a text message;
displaying a first portion of said text message via a visual display;
converting a second portion of said text message into a voice message; and
providing said voice message to a user via audio output.

22. The method of claim 21 further comprising the step of:
determining the division of said text message into said first and second portions based on user defined preferences.

23. The method of claim 21 further comprising the step of:
determining the division of said text message into said first and second portions based on said text message's contents.

24. A wireles communication device comprising:
a transceiver for receiving a text message;
a visual display;
an audio output;
a controller for executing stored computer program instructions for controlling the operation of said wireless communication device, said operation comprising the steps of:
displaying a first portion of said text message via said visual display;
converting a second portion of said text message into a voice message; and
providing said voice message to a user via said audio output.

25. The wireless communication device of claim 24 further comprising:
a memory for storing user preference data indicating the division of said text message into said first and second portions.

* * * * *